(12) United States Patent
Engelen et al.

(10) Patent No.: US 11,582,058 B2
(45) Date of Patent: Feb. 14, 2023

(54) IDENTIFYING AND CONTROLLING SIGNAL INFLUENCE ON ONE OR MORE PROPERTIES OF EMITTED LIGHT

(71) Applicant: SIGNIFY HOLDING B.V., Eindhoven (NL)

(72) Inventors: Dirk Valentinus Rene Engelen, Heusden-Zolder (BE); Dzmitry Viktorovich Aliakseyeu, Eindhoven (NL); Tatiana Aleksandrovna Lashina, Eindhoven (NL); Philip Steven Newton, Waalre (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 694 days.

(21) Appl. No.: 15/532,253

(22) PCT Filed: Nov. 27, 2015

(86) PCT No.: PCT/IB2015/059171
§ 371 (c)(1),
(2) Date: Jun. 1, 2017

(87) PCT Pub. No.: WO2016/088006
PCT Pub. Date: Jun. 9, 2016

(65) Prior Publication Data
US 2017/0367164 A1    Dec. 21, 2017

Related U.S. Application Data

(60) Provisional application No. 62/085,768, filed on Dec. 1, 2014.

(51) Int. Cl.
*H05B 47/10* (2020.01)
*H04L 12/28* (2006.01)
(Continued)

(52) U.S. Cl.
CPC ........ *H04L 12/282* (2013.01); *H04L 12/2825* (2013.01); *H04W 4/00* (2013.01);
(Continued)

(58) Field of Classification Search
CPC ............. H04L 12/282; H04L 2012/285; H04L 2012/2841; H05B 47/19; H05B 47/115;
(Continued)

(56) References Cited

U.S. PATENT DOCUMENTS

| | | | |
|---|---|---|---|
| 6,016,038 A | 1/2000 | Mueller et al. | |
| 6,211,626 B1 | 4/2001 | Lys et al. | |

(Continued)

FOREIGN PATENT DOCUMENTS

| | | |
|---|---|---|
| CN | 102724668 A | 10/2012 |
| CN | 103561513 A | 2/2014 |

(Continued)

*Primary Examiner* — Tung X Le

(57) ABSTRACT

Systems, and methods are described herein for identifying and/or controlling influence and/or potential influence of one or more signals on one or more properties of light emitted by one or more lighting units (100). In various embodiments, one or more signals may be identified that influence, or potentially influence, a manner in which a lighting unit controller (110) controls one or more properties of light to be emitted by a lighting unit (100). In some embodiments, a user instruction may be received to alter the manner in which the one or more signals influence how the lighting unit controller (110) controls the one or more properties of light emitted by the lighting unit (100) may be received. The lighting unit controller (110) may control a manner in which light output of the lighting unit (100) is influenced by the one or more signals in accordance with the user instruction.

10 Claims, 6 Drawing Sheets

(51) Int. Cl.
  *H04W 4/00* (2018.01)
  *H05B 47/19* (2020.01)
  *H05B 47/115* (2020.01)
  *H04W 4/80* (2018.01)
  *H04W 4/21* (2018.01)

(52) U.S. Cl.
  CPC ........... *H05B 47/115* (2020.01); *H05B 47/19* (2020.01); *H04L 2012/285* (2013.01); *H04L 2012/2841* (2013.01); *H04W 4/21* (2018.02); *H04W 4/80* (2018.02)

(58) Field of Classification Search
  CPC ............... H05B 47/125; H05B 47/165; H05B 47/195
  USPC .......................................... 315/291–297, 131
  See application file for complete search history.

(56) References Cited

U.S. PATENT DOCUMENTS

| | | | | |
|---|---|---|---|---|
| 9,572,230 | B2* | 2/2017 | Reed | H05B 47/16 |
| 11,041,779 | B1* | 6/2021 | Bagwell | G08B 21/182 |
| 2011/0277001 | A1* | 11/2011 | Kaluskar | H04N 21/43615 |
| | | | | 370/401 |
| 2012/0133303 | A1* | 5/2012 | Campbell | H04W 4/33 |
| | | | | 315/312 |
| 2012/0212156 | A1* | 8/2012 | Saes | H05B 47/105 |
| | | | | 315/312 |
| 2012/0235579 | A1* | 9/2012 | Chemel | F21S 2/005 |
| | | | | 315/152 |
| 2013/0026945 | A1* | 1/2013 | Ganick | G01S 1/70 |
| | | | | 315/246 |
| 2013/0083805 | A1* | 4/2013 | Lu | H04L 12/2807 |
| | | | | 370/401 |
| 2014/0001963 | A1* | 1/2014 | Chobot | H05B 37/02 |
| | | | | 315/153 |
| 2014/0033571 | A1 | 2/2014 | Gillespie | |
| 2014/0062297 | A1* | 3/2014 | Bora | H05B 45/10 |
| | | | | 315/297 |
| 2014/0191682 | A1* | 7/2014 | Pederson | H05B 47/185 |
| | | | | 315/294 |
| 2014/0191848 | A1* | 7/2014 | Imes | H04B 5/0031 |
| | | | | 340/10.5 |
| 2015/0130359 | A1* | 5/2015 | Bosua | H05B 45/30 |
| | | | | 315/294 |
| 2015/0327304 | A1* | 11/2015 | Tinnakornsrisuphap | H04L 41/0806 |
| | | | | 709/227 |
| 2016/0036484 | A1* | 2/2016 | Sullivan | H04L 12/282 |
| | | | | 315/291 |
| 2016/0073440 | A1* | 3/2016 | Pallen | H04W 76/15 |
| | | | | 370/329 |
| 2016/0088707 | A1* | 3/2016 | Van De Sluis | H05B 47/19 |
| | | | | 315/297 |

FOREIGN PATENT DOCUMENTS

| | | |
|---|---|---|
| JP | 2002260877 A2 | 9/2002 |
| JP | 2009295399 A | 12/2009 |
| WO | 2012068517 A1 | 5/2012 |
| WO | 2014033571 A2 | 3/2014 |

\* cited by examiner

IDENTIFYING AND CONTROLLING SIGNAL INFLUENCE ON ONE OR MORE PROPERTIES OF EMITTED LIGHT

CROSS-REFERENCE TO PRIOR APPLICATIONS

This application is the U.S. National Phase application under 35 U.S.C. § 371 of International Application No. PCT/IB2015/059171, filed on Nov. 27, 2015, which claims the benefit of U.S. Patent Application No. 62/085,768, filed on Dec. 1, 2014. These applications are hereby incorporated by reference herein.

TECHNICAL FIELD

The present invention is directed generally to lighting control. More particularly, various inventive methods and apparatus disclosed herein relate to identifying and/or controlling influence and/or potential influence of one or more signals on one or more properties of light emitted by one or more lighting units.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Various signals obtainable by a lighting unit controller may influence, or have the potential of influencing, how the lighting unit controller controls one or more properties of light emitted by one or more lighting units. A wall switch may provide a signal to a lighting unit controller that influences whether the lighting unit controller causes a lighting unit to emit light or not, as well as how the lighting unit controller controls a brightness of light emitted by the lighting unit if the wall switch is dimmable. A wake up routine implemented by, for instance, a lighting system bridge, may influence a lighting unit controller to gradually increase an intensity of light emitted by one or more lighting units. A user presence simulation routine may influence a lighting unit controller to cause one or more lighting units to emit light to simulate the presence of one or more persons, e.g., for security purposes. One or more rules, e.g., promulgated by a lighting system bridge, may influence how a lighting unit controller controls various properties of light emitted by one or more lighting units (e.g., dim lights after 11 pm). Third party services and/or applications, such as social networks, may also influence how a lighting unit controller controls one or more properties of light emitted by a lighting unit, e.g., using technology such as "if this then that," or "IFTTT."

The influence such signals have on how a lighting unit controller controls light emitted by a lighting unit may be altered by multiple parties with different needs and agendas. There is no guarantee that these parties will cooperate or even communicate with each other about their lighting choices. For example, assume a child configures a lamp to flash when the child's favorite team scores a goal. A parent watching television near the lamp may not understand why the lamp flashed. The parent may have no way of finding out why the light flashed other than by asking the child. The child may or may not be available, and may or may not remember configuring the lamp. Thus, there is a need in the art to provide a way to ascertain and/or control how one or more signals influence one or more lighting units.

SUMMARY

The present disclosure is directed to inventive methods and apparatus for identifying and/or controlling influence and/or potential influence of one or more signals, obtainable by a lighting unit controller, that affect how the lighting unit controller controls one or more properties of light emitted by one or more lighting units. For example, a user may operate a mobile computing device such as a tablet computing device or a smart phone to obtain an identifier associated with a lighting unit controller that controls light output of one or more lighting units. The mobile computing device may use the identifier to establish communication with the lighting unit controller, and to obtain from the lighting unit controller data indicative of one or more signals that influence, or potentially influence, how the lighting unit controller controls one or more properties of light emitted by the lighting unit. The mobile computing device may render a user interface that displays to the user the various signals and how each influences (or potentially influences) light emitted by one or more lighting units. In some instances, the user may operate the user interface to alter the manner in which the one or more signals influence, or potentially influence, how the lighting unit controller controls one or more properties of light emitted by the lighting unit. The mobile computing device may cause the lighting unit controller to implement the user's commands. In other instances, the user interface may simply report on the influences.

Generally, in one aspect, a computing device may include: one or more processors; a wireless communication interface operably coupled with the one or more processors; and memory operably coupled with the one or more processors. The memory may store instructions that, in response to execution of the instructions by the one or more processors, cause the one or more processors to: receive, from a lighting unit controller over the wireless communication interface, data indicative of one or more signals obtainable by the lighting unit controller that influence, or potentially influence, a manner in which the lighting unit controller controls one or more properties of light to be emitted by a lighting unit; and display a visual representation of the one or more signals and a manner in which the one or more signals influence, or potentially influence, the manner in which the lighting unit controller controls one or more properties of light emitted by the lighting unit.

In various embodiments, the computing device includes a user input, and the memory further stores instructions that, in response to execution of the instructions by the one or more processors, cause the one or more processors to: receive, at the user input, a user instruction to alter the manner in which the one or more signals influence how the lighting unit controller controls the one or more properties of light emitted by the lighting unit; and transmit, via the wireless communication interface to the lighting unit controller, an indication of the user instruction. In various versions, the user input comprises a touch screen, and the memory further stores instructions that, in response to execution of the instructions by the one or more processors, cause the one or more processors to render, on the touch screen, a user interface operable to alter the manner in which the one or more signals influence the one or more properties of light emitted by the lighting unit. In various versions, the memory further stores instructions that, in response to execution of the instructions by the one or more processors, cause the one or more processors to render an indication of relative priorities of influence by the one or more signals. In various versions, the memory further stores instructions that, in response to execution of the instructions by the one or more processors, cause the one or more processors to render one or more graphical elements that are operable by a user to alter the relative priorities of influence by the one or more signals.

In various embodiments, the memory further stores instructions that, in response to execution of the instructions by the one or more processors, cause the one or more processors to receive, via the wireless communication interface from the lighting unit controller, data indicative of the one or more signals that influence, or potentially influence, how the lighting unit controller controls the one or more properties of light emitted by the lighting unit.

In various versions, the memory further stores instructions that, in response to execution of the instructions by the one or more processors, cause the one or more processors to: obtain, from the lighting unit, an identifier associated with the lighting unit controller; and establish communication with the lighting unit controller via the wireless communication interface based on the identifier. In various versions, the memory further stores instructions that, in response to execution of the instructions by the one or more processors, cause the one or more processors to extract the identifier associated with the lighting unit controller from coded light emitted by the lighting unit. In various versions, the memory further stores instructions that, in response to execution of the instructions by the one or more processors, cause the one or more processors to extract the identifier associated with the lighting unit controller from a coded light effect projected by the lighting unit onto one or more surfaces. In various versions, the memory further stores instructions that, in response to execution of the instructions by the one or more processors, cause the one or more processors to extract the identifier associated with the lighting unit controller from a radio signal emitted by the lighting unit.

In various embodiments, the one or more signals include a service or application operating on one or more remote computing devices. In various versions, the service or application comprises a social networking service. In various embodiments, the one or more signals include a user presence simulation routine or a wake up routine.

In various embodiments, the one or more signals include one or more rules associated with a lighting system of which the lighting unit is a member. In various embodiments, the one or more signals include output of one or more sensors, such as a presence sensor or a light sensor.

In various embodiments, the memory further stores instructions that, in response to execution of the instructions by the one or more processors, cause the one or more processors to ascertain one or more signals that have previously influenced how the lighting unit controller controlled, or will influence in the future how the lighting unit controller controls, one or more properties of light emitted by the lighting unit.

In another aspect, a computer-implemented method may include: determining, by a lighting unit controller that controls one or more lighting sources, one or more signals, external to the lighting unit controller and one or more lighting sources controlled by the lighting unit controller, that influence, or potentially influence, how the lighting unit controller controls one or more properties of light to be emitted by the one or more lighting sources; and making available, by the lighting unit controller, data indicative of the one or more signals.

In various embodiments, the method may further include altering, by the lighting unit controller, a manner in which the one or more signals influence how the lighting unit controller controls the one or more properties of light emitted by the lighting unit in accordance with a user instruction. In various versions, the altering includes: generating one or more lighting control commands based at least in part on the user instruction; and transmitting the one or more lighting control commands to the lighting unit. In various versions, the generating includes: no longer taking into account at least one signal that previously influenced the manner in which the one or more signals influence how the lighting unit controller controls the one or more properties of light emitted by the lighting unit; or taking into account at least one new signal that did not previously influence the manner in which the one or more signals influence how the lighting unit controller controls the one or more properties of light emitted by the lighting unit. In various versions, the altering includes altering the manner in which a first signal influences a manner in which the lighting unit controller controls a particular property of light emitted by the lighting unit relative to a second signal.

In various embodiments, the lighting unit is a first lighting unit, and the method further includes altering, by the lighting unit controller, a manner in which the one or more signals influence how the lighting unit controller controls one or more properties of light emitted by a second lighting unit in accordance with the user instruction.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "signal" as used herein broadly refers to entities, components, rules, state machines, and so forth, that may influence, or potentially influence, how a lighting controller controls one or more properties of light emitted by one or more lighting units. In various implementations, signals may be external to the lighting unit controller and one or more lighting sources controlled by the lighting unit controller. Example signals may include but are not limited to wall switches (including dimmable wall switches), third party services and applications (e.g., social network activities, scores of sporting events, etc.), lighting control rules (e.g., dim lights after 11 pm) promulgated by lighting system bridges or other similar components, lighting scenes, sensors (e.g., presence, light, sound, motion, etc.), lighting control applications operating on computing devices, emergency events such as fire alarms, power events such as surges or outages, states and/or operations of other home appliances (e.g., dishwashers, stoves, ovens, microwaves, toasters, refrigerators, televisions, alarm clocks, blenders, stereos, heaters, air conditioners), and so forth.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Various signals may influence, or may have the potential of influencing, one or more properties of light emitted by one or more lighting units. The influence such signals have on light output of a lighting unit may be controlled by multiple parties with different needs and agendas, and there is no guarantee that these parties will cooperate or even communicate with each other about their lighting choices. Thus, there is a need in the art to provide a way to ascertain and/or control how one or more signals influence one or more lighting units. Applicants have recognized and appreciated that it would be beneficial to control how one or more signals influence light output of one or more lighting units using a mobile computing device such as a smart phone, tablet computing device, or wearable computing devices (e.g., smart glasses, smart watch, etc.). In view of the foregoing, various embodiments and implementations of the present invention are directed to identifying and/or controlling influence and/or potential influence of one or more signals on one or more properties of light emitted by one or more lighting units.

Figure 1:
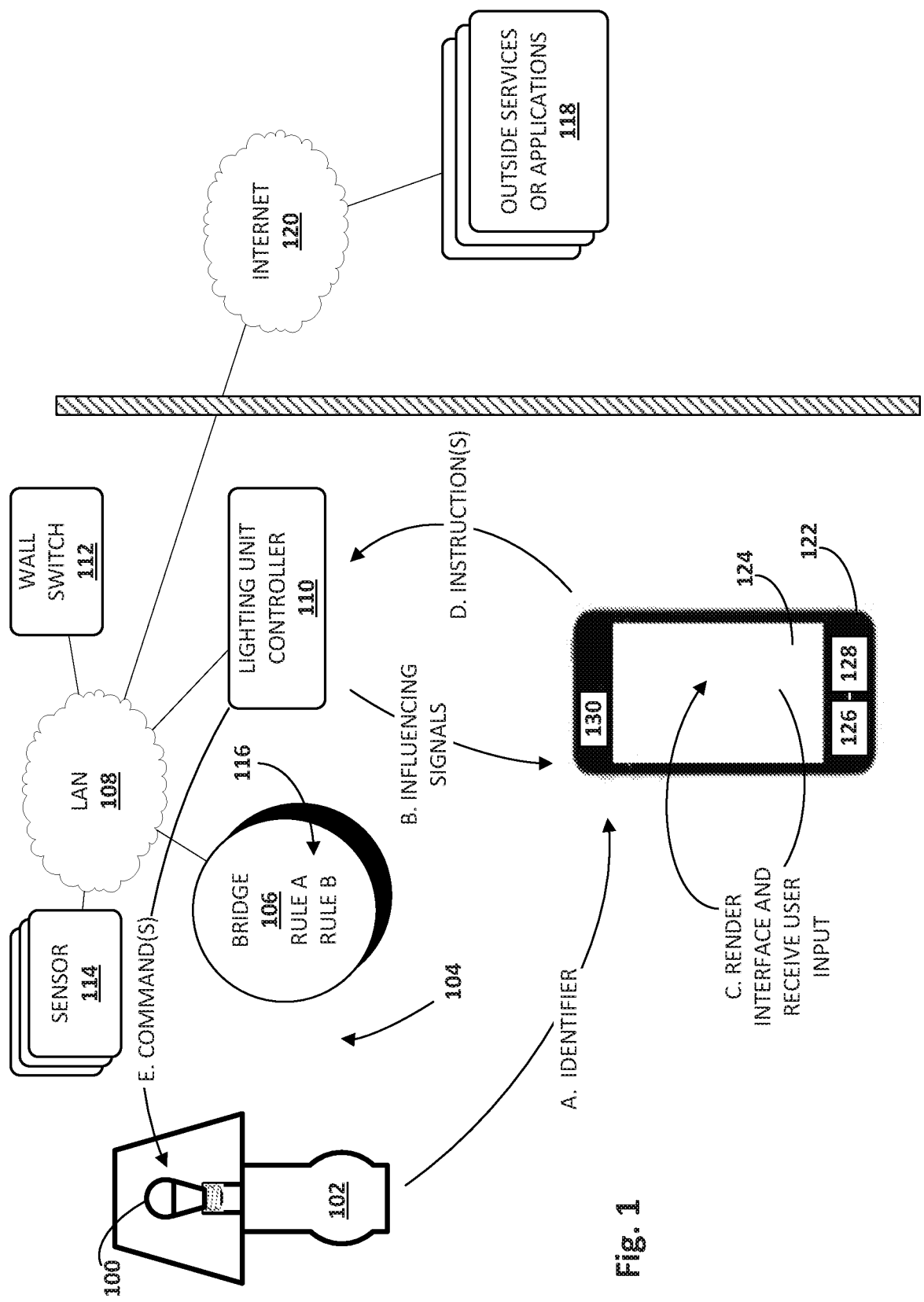
FIG. 1 illustrates an example environment in which disclosed techniques may be implemented, in accordance with various embodiments.

Referring to FIG. 1, in one embodiment, a lighting unit 100 configured with selected aspects of the present disclosure may be installed in a luminaire 102. While the example of FIG. 1 is a light bulb installed in a table lamp, this is not meant to be limiting. Various types of lighting units, such as LED-based lighting units, may be installed in a variety of luminaires types, including but not limited to hanging luminaires, standing luminaires, wall and/or ceiling fixtures, and so forth. Lighting unit 100 may be associated with a lighting system 104, though this is not required in all embodiments. Lighting system 104 may be controlled by a lighting system bridge 106, which may be a computing device in communication with one or more lighting units, including lighting unit 100.

Lighting system bridge 106 may also be in communication with other devices and components over one or more networks, such as a local area network ("LAN") 108. In various embodiments, LAN 108 may employ one or more wired and/or wireless technologies to communicate with other devices and components over one or more networks, including but not limited to Ethernet, Wi-Fi, and so forth. Lighting system bridge 106 may be in communication with lighting unit 100 using similar technologies, or lighting system bridge 106 may be in communication with lighting unit 100 using other technologies, including but not limited to radio, ZigBee, coded light, and so forth.

Lighting system bridge 106 may be in communication with one or more lighting unit controllers 110. Lighting unit controller 110 may be configured to control one or more properties of light emitted by lighting unit 100. Lighting unit controller 110 may be implemented with any combination of hardware or software. In some embodiments, lighting unit controller 110 may be an integral part of lighting unit 100. In other embodiments, including the one depicted in FIG. 1, lighting unit controller 110 may be a process or service operating on a device separate from lighting unit 100. In some embodiments, lighting unit controller 110 may operate on lighting system bridge 106. In some embodiments, a single lighting unit controller 110 may control a single lighting unit 100 or multiple lighting units. In some embodiments, lighting unit controller 110 may also be referred to as an "aggregator," particularly where a single lighting unit controller 110 maintains and/or manages all influencers for a particular lighting unit or group of lighting units.

Various signals obtainable by lighting unit controller 110 may influence, or potentially may influence, how lighting unit controller 110 controls light output by lighting unit 100. For example, lighting unit controller 110 may take into account (in some instances first and foremost) a state of wall switch 112. In various embodiments, wall switch 112 may be an on/off switch and/or a dimmable switch. In some embodiments, wall switch 112 may offer more robust lighting control capabilities, such as adjustment of one or more properties of light (e.g., hue, saturation, color temperature, brightness, etc.) emitted by lighting unit 100. For instance, wall switch 112 may be configured to transmit various actions to lighting unit controller 110, such as "set lamp on," "set lamp off," "start scene01," "stop scene01," "brighten lamp," "dim lamp," set RGB R=100, G=255, B=0," "start dynamicScene03," and so forth.

One or more sensors 114 may also act as signals that influence or potentially influence how lighting unit controller 110 controls light output by lighting unit 100. For example, a presence sensor may sense a nearby presence and provide a presence signal in response. The presence signal may cause lighting unit controller 110 to turn lighting unit 100 on (e.g., if it is off), to increase a brightness of light emitted by lighting unit 100 (e.g., to illuminate the area for whatever triggered the presence sensor), and so forth. A light sensor may provide a signal indicative of sensed ambient light, e.g., sunlight. The light sensor signal may cause lighting unit controller 110 to adjust one or more properties of light emitted by lighting unit 100, e.g., to compensate for increased/decreased availability of natural light.

A sound sensor may raise a sound signal in response to various sounds (e.g., footsteps, glass breaking, baby crying, etc.). That sound signal may cause lighting unit controller 110 to adjust one or more properties of light emitted by lighting unit 100, e.g., to raise an alarm. A smoke alarm may raise a signal (e.g., in addition to an audible alarm) in response to detection of smoke. That smoke signal may cause lighting unit controller 110 to, for instance, cause lighting unit 100 to flash conspicuously. A security sensor, e.g., such as might be found on a door or window, may raise a security signal (e.g., in conjunction with an audible alarm) when an intruder breaks in. That security signal may cause lighting unit controller 110 to, for instance, cause lighting unit 100 to flash conspicuously. One or more sensors 114 may include other types of sensors as well, including but not limited to thermometers, barometers, touch sensors, accelerometers, trip wires, and so forth.

One or more rules 116 may also act as signals that influence or potentially influence how lighting unit controller 110 controls light output by lighting unit 100. Rules 116 are depicted as being integral with (e.g., stored in memory of) lighting system bridge 106. However, this is not meant to be limiting, and rules 116 may be stored elsewhere, e.g., in memory associated with lighting unit controller 110, or on another computing device (not depicted) in network communication with LAN 108.

Rules 116 may come in a variety of forms. Some rules compare a variable (e.g., current time) to a criterion (e.g., <11 pm), and take some action if the criterion is met (e.g., dimming or turning off lighting unit 100). Other rules compare more complex data, such as states or operations of other devices. For example, one rule may cause lighting unit controller 110 to cause lighting unit 100 to emit light having various properties depending on an oven temperature. If the oven meets or exceeds a particular threshold (e.g., a desired temperature), then lighting unit controller 110 may operate lighting unit 100 to emit a lighting pattern that notifies a user that, for instance, the oven is preheated. In some embodiments, some rules may come in a form such as "if TRIGGER, (evaluate CONDITION), then perform ACTION." For example, "TRIGGER" could be "presence detected by sensor." "CONDITION" could be, for example, "time<22:00" or something similar. "ACTION" could be, for example, "set lamp brightness=max."

One or more outside services and/or applications 118 may also act as signals that influence or potentially influence how lighting unit controller 110 controls light output by lighting unit 100. Outside services and/or applications 118 may communicate with lighting unit controller 110 through one or more networks, including but not limited to the Internet 120, to which LAN 108 may be connected (e.g., through a modem). Lighting unit controller 110 may be associated with outside services and/or applications 118 in various ways. In some embodiments, connection technology such as IFTTT may be employed.

Outside services and/or applications 118 may come in various forms. One example is a social networking service. A social networking service, or simply "social network," may provide signals various forms that may influence a manner in which lighting unit controller 110 controls light output of lighting unit 100. For example, incoming or outgoing social network messages, friend requests, event invites, wall postings, status changes, picture uploads; lighting unit controller 110 may be configured to take these signals into account when selecting one or more properties of light to be emitted by lighting unit 100.

Another example of outside services and/or applications 118 may be a web service. Lighting unit controller 110 may be configured to communicate with one or more web services using various communication technologies and/or methodologies, such as Simple Object Access Protocol ("SOAP"), Web Services Description Language ("WSDL"), representational state transfer ("REST")-based communications, and so forth. For instance, a user may connect lighting unit controller 110 to a web service that provides news updates about a selected topic (e.g., a favorite sporting team, celebrity of interest, location of interest, etc.). When breaking news occurs, lighting unit controller 110 may operate lighting unit 100 to emit various types of lighting effects, such as blinking when the user's favorite team scores a goal.

A user may operate a mobile computing device 122 such as a smart phone, tablet computing device, smart watch, smart glasses, laptop computer, and so forth, to identify one or more signals that influence, or that potentially influence, a manner in which lighting unit controller 110 controls one or more properties of light emitted by lighting unit 100. In the example of FIG. 1, mobile computing device 122 is in the form of a smart phone with a touch screen 124. Mobile computing device 122 may include one or more processors 126, which may be operably coupled with memory (not depicted in FIG. 1) that includes instructions that are executable by one or more processors 126. One or more processors 126 may be operably coupled with a wireless communication interface 128. In some embodiments, mobile computing device 122 may include a camera 130.

Wireless communication interface 128 may come in various forms and may enable mobile computing device 122 to communicate with other devices in various ways. In various embodiments, wireless communication may utilize Wi-Fi, BlueTooth, RFID, NFC, ZigBee, and other similar technologies/protocols to communicate with remote devices. In some such embodiments, camera 130 may itself operate as a wireless communication interface, e.g., to receive coded light signals from lighting unit 100.

The components depicted in FIG. 1 may interact as shown by arrows A-E to enable a user of mobile computing device 122 to alter a manner in which one or more signals influences one or more properties of light emitted by lighting unit 100. At arrow A, mobile computing device 122 may obtain from lighting unit 100 an identifier associated with lighting unit controller 110. In embodiments where lighting unit controller 110 operates as part of lighting unit 100, lighting unit 100 may simply provide its own identifier. In various embodiments, the "identifier" may contain sufficient information for mobile computing device 122 to establish communication with lighting unit controller 110. For example, the identifier may be a network address such as an IP address. Lighting unit 100 may make the identifier available to mobile computing device 122 wirelessly, e.g., using technologies such as coded light (which may be detected at camera 130), ZigBee, NFC, visual indicia (e.g., by smart phone scanning a QR or bar code on luminaire 102), a radio signal, and so forth.

Once mobile computing device 122 has the identifier, it may establish communication with lighting unit controller 110. During this communication, and as shown at arrow B, mobile computing device 122 may obtain data indicative of the one or more signals that influence, or potentially influence, how lighting unit controller 110 controls one or more properties of light emitted by lighting unit 100.

At arrow C, mobile computing device 122 may render, e.g., on touch screen 124, a user interface operable to alter a manner in which one or more signals influence one or more properties of light emitted by lighting unit 100. This user interface may include various features. In some embodiments, the user interface may provide an indication of relative priorities of influence by one or more signals on output of lighting unit 100. In some embodiments, the user interface may provide one or more graphical elements that are operable by a user to alter the relative priorities of influence by the one or more signals. Signal priorities will be discussed in more detail below. Also at arrow C, a user may provide, e.g., at the rendered user interface, one or more user instructions to alter a manner in which the one or more signals influence how lighting unit controller 110 controls one or more properties of light emitted by lighting unit 100.

At arrow D, mobile computing device 122 may provide data indicative of the one or more user instructions to control light output by lighting unit 100 to lighting unit controller 110. At arrow E, lighting unit controller 110 may then implement the user's instructions accordingly, e.g., by taking into account the manner in which the user desires the one or more signals to influence light output of lighting unit 100 when generating one or more lighting control commands, and transmitting those commands to lighting unit 100. For example, assume a user provides an instruction at mobile computing device 122 to cause lighting unit controller 110 to disregard a signal from one or more sensors 114 when selecting one or more properties of light to be emitted by lighting unit 100, but to begin regarding a signal from one or more outside services and/or applications 118 instead. At arrow E, lighting unit controller 110 may generate one or more lighting control commands that are no longer influenced by the signal from one or more sensors but are now influenced by one or more outside services and/or applications 118, and may transmit those commands to lighting unit 100.

Figure 2:
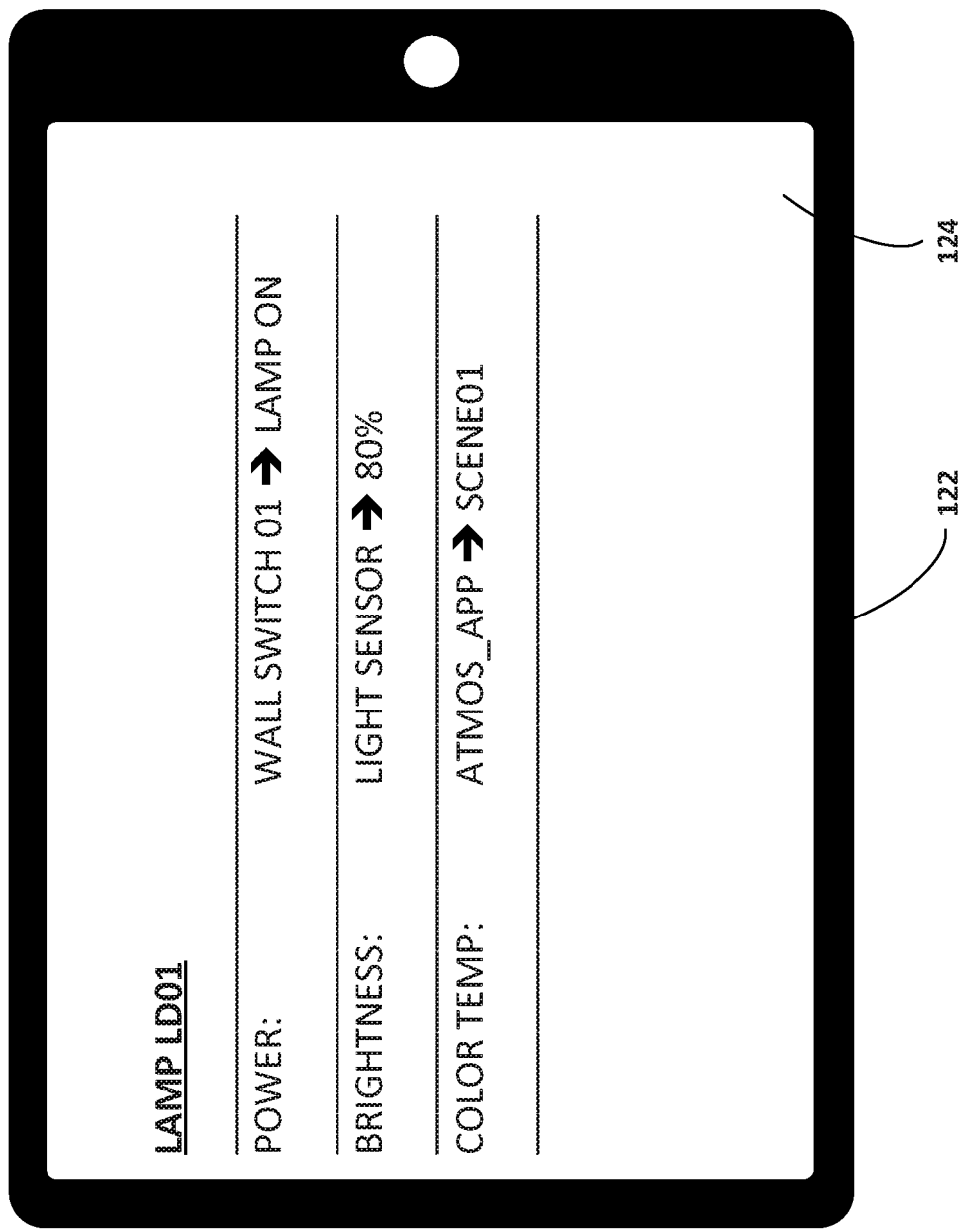
FIGS. 2-4 depict various user interfaces that may be rendered on a mobile computing device to enable determination and modification of influence by one or more signals on light output of a lighting unit, in accordance with various embodiments.
Figure 3:
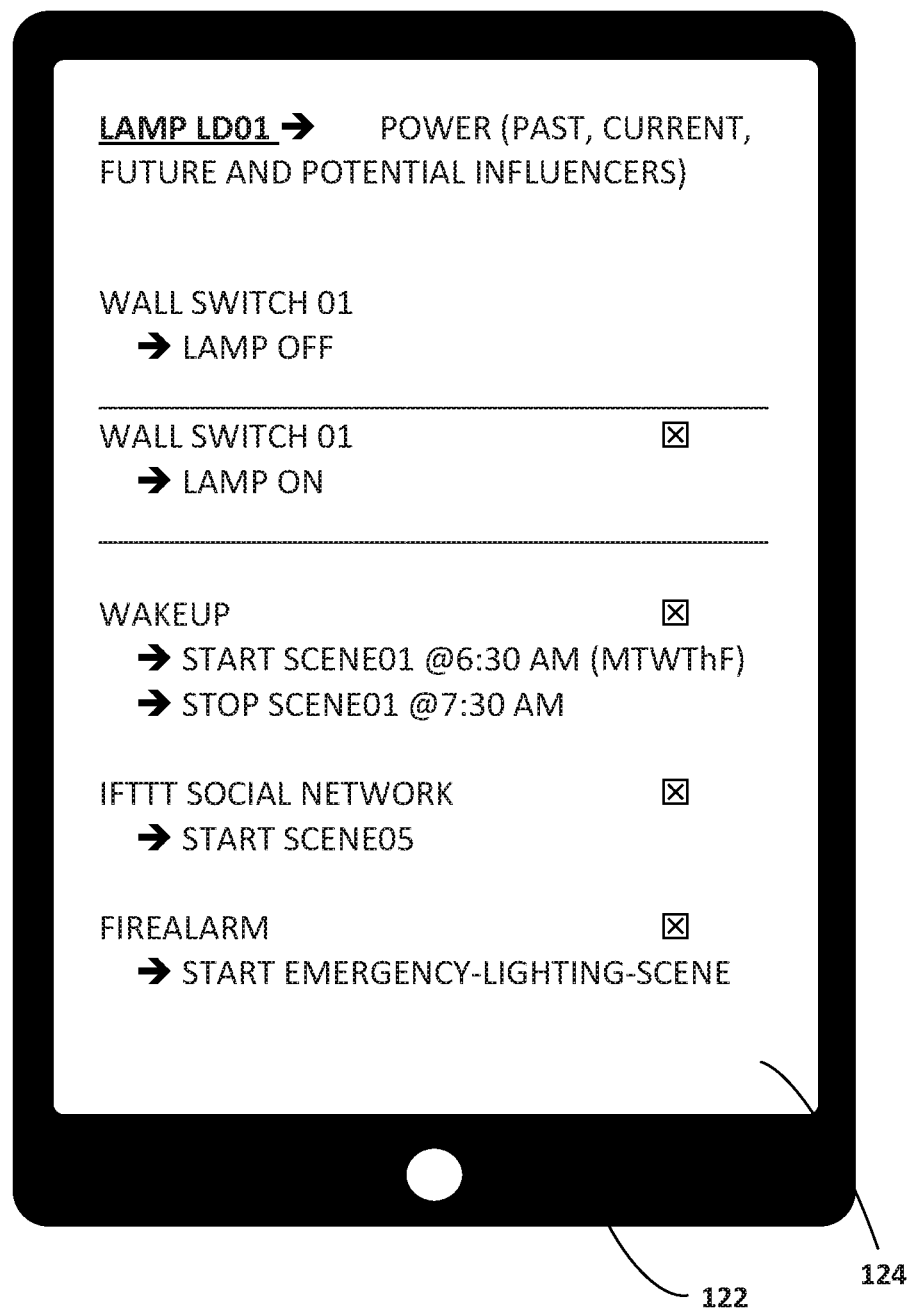
Figure 4:
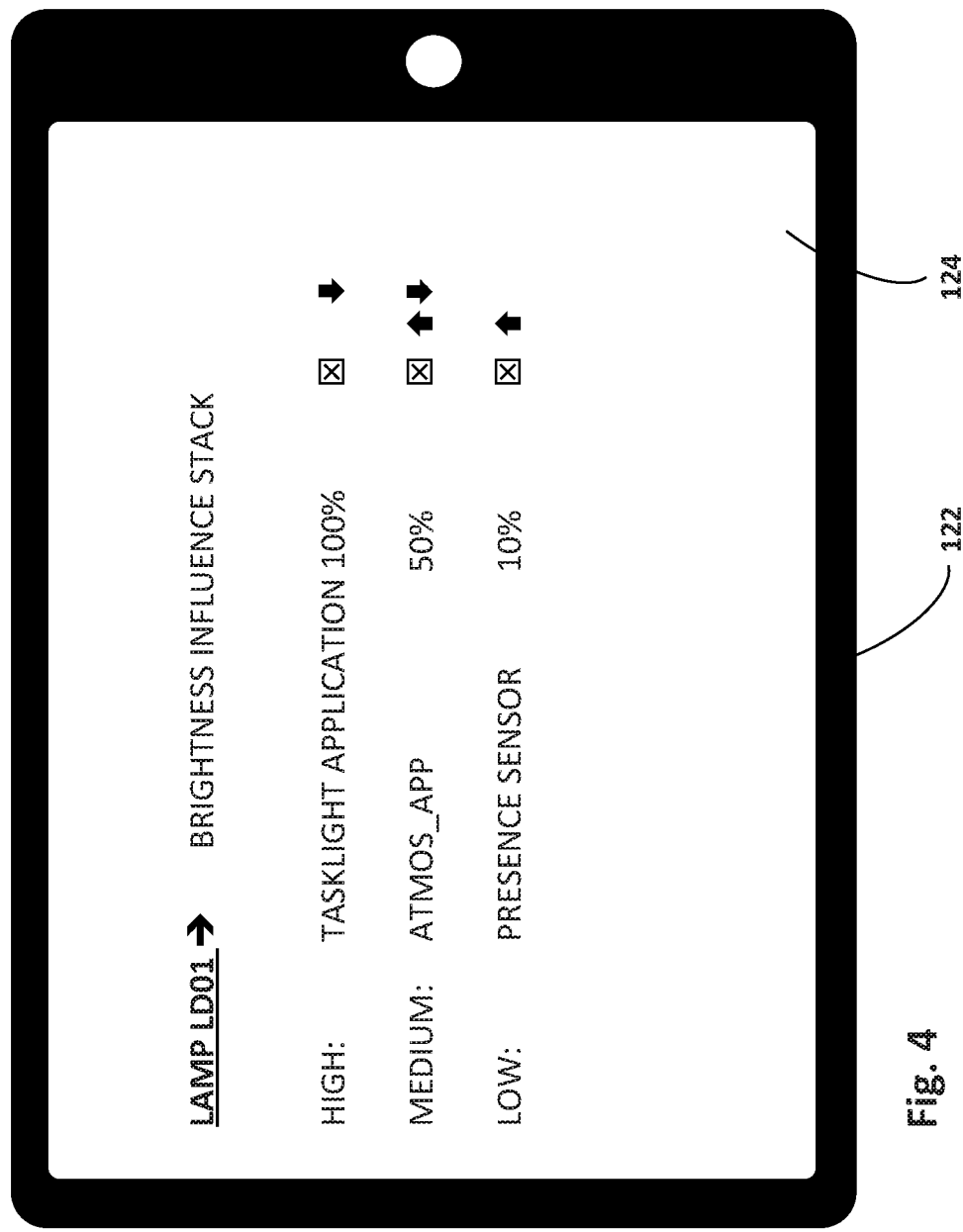

FIGS. 2-4 depict various user interfaces that may be rendered on mobile computing device 122 to enable a user to review one or more signals that influence, or potentially influence, one or more properties of light emitted by a lighting unit such as lighting unit 100. These interfaces may also enable the user to alter a manner in which the identified signals influence one or more properties of light emitted by a lighting unit such as lighting unit 100.

FIG. 2 depicts an example of an interface that both shows a user what signals are influencing light output of a lighting unit and allows a user to navigate to other interfaces that enable the user to alter how those signals influence the light output. Information for an example lamp, "LAMP_LD01" is rendered on touch screen 124. This information includes signals that influence three properties of light emitted by a lighting unit: power; brightness; and color temperature. Other properties of light emitted by a lighting unit may be influenced by signals; these are just examples.

"Power" is currently influenced by a signal, "WALL SWITCH 01" (e.g., 112 in FIG. 1) which has been operated to turn the lamp on. If "WALL SWITCH 01" were turned off, then a state of the power parameter may be altered, e.g., to turn the lighting unit off. In some embodiments, if lighting unit power is turned off, then other parameters of the lighting unit, such as brightness and color temperature, may automatically be disregarded by a corresponding lighting unit controller (in some instances if there is no power, then there can be no brightness or color temperature). "Brightness" is currently influenced by a signal, "LIGHT SENSOR" (e.g., 114 in FIG. 1), which has caused the lighting unit to emit 80% brightness. "Color Temperature" is currently influenced by a signal, "ATMOS_APP" (e.g., 116 in FIG. 1), which has caused the lighting unit to emit light having one or more properties that are set forth in lighting scene "SCENE01."

If a user operates a graphical element associated with "POWER" in FIG. 2—e.g., by tapping on or near the word "POWER"—the user may be lead to another interface, such as the one depicted in FIG. 3. The interface in FIG. 3 shows past, current and future potential signals that may influence one or more properties of light that is emitted by a lighting unit such as lighting unit 100 in FIG. 1. The current influencing signal, encompassed by horizontal bars, is "WALL SWITCH 01" having been turned on.

A previous influencing signal, shown above the currently influencing signal, was "WALL SWITCH 01" having been turned off. A future potentially influencing signal, "WAKEUP," includes a routine to be operated by some component (e.g., lighting unit controller 110, lighting system bridge 106, etc.). That routine includes causing lighting unit to emit "SCENE01" starting at 6:30 am on Monday-Friday. The routine ends at 7:30 am, at which time the lighting unit may shut off (assuming the user didn't already shut it off when leaving for work).

Potential, or "announced," influencing (or potentially influencing) signals include "IFTTT SOCIAL NETWORK" and "FIREALARM." "IFTTT SOCIAL NETWORK" may be a routine by which a social network event (e.g., receipt of an incoming message, a change in status, friendship invitation, event invitation, etc.) triggers a lighting unit controller to cause a lighting unit to emit light in accordance with the lighting scene, "SCENE05." "FIREALARM" includes a routine by which the lighting unit controller causes a lighting unit to emit an "EMERGENCY-LIGHTING-SCENE." "FIREALARM" may be triggered in response to, for instance, a signal from a smoke alarm or a pulled fire alarm.

A user also may press the "x" buttons adjacent each signal to toggle on or off influence the respective signal has on light output of the lighting unit. In some embodiments, pressing the "x" adjacent a signal may stop the influence of the signal on a single property of light emitted by a single lighting unit. In some embodiments, pressing the "x" adjacent a signal may stop the influence of the signal on multiple properties of light emitted by a single lighting unit. In some embodiments, pressing the "x" adjacent a signal may stop the influence of the signal on a single property of light emitted by multiple lighting units. In some embodiments, pressing the "x" adjacent a signal may stop the influence of the signal on multiple properties of light emitted by multiple lighting units. Other graphical elements besides an "x" may be used to toggle on/off influence by signals. For example, a button may be used, and may read, "stop." As another example, a user may "swipe" a particular signal off touch screen 124, effectively removing that signal's influence on light output.

FIG. 4 depicts another interface that shows a stack of influences on a particular property of light, brightness, emitted by a lighting unit. This interface may be rendered, for instance, in response to a user tapping a graphical element associated with "BRIGHTNESS" in FIG. 2. In this example, three signals are considered by the lighting unit controller when selecting a level of brightness to be emitted by a lighting unit. The highest priority signal is "TASK-LIGHT APPLICATION," which currently calls for brightness to be at 100% (e.g., because a user is using light emitting by the lighting unit to perform a task). A signal called "ATMOS_APP" has a medium priority, and a signal corresponding to a "PRESENCE SENSOR" has the lowest priority.

In some embodiments, signals may influence a lighting property in proportion to their priority. For instance, in FIG. 4, the highest priority signal (TASKLIGHT APPLICATION) may assert the most influence on overall brightness of light emitted by a lighting unit. ATMOS-APP may assert less influence, and PRESENCE SENSOR may assert the least influence, if any, of the three signals. In other embodiments, only the highest priority signal asserts influence on a particular lighting property.

For instance, while the user needs a task light to illuminate whatever she is working on, the TASKLIGHT APPLICATION may take priority. However, once the user is done and the TASKLIGHT APPLICATION ceases, the next highest priority signal may then take over. For example, the ATMOS_APP may cause the lighting unit to emit mood lighting at 50% brightness (other lighting properties may be effected by ATMOS-APP as well), rather than the stark 100% brightness emitted by the lighting unit while TASK-LIGHT APPLICATION was in operation. If the user decides she no longer wants mood lighting, she may cease the ATMOS_APP, e.g., by operating her mobile phone to terminate the mood lighting. At that point, PRESENSE SENSOR may be the last remaining signal that may potentially influence light output of the lighting unit, and may cause lighting unit to emit 10% brightness on detection by a presence sensor (e.g., 114) of a presence.

While three signals are depicted in FIG. 4, this is not meant to be limiting. More or less signals may influence, or have the potential to influence, a given property of light. Priorities of various signals may also be adjusted. For example, in FIG. 4, a user may press the up and down arrows on the right to move each signal up and/or down the brightness influence stack. Similar to what was depicted in FIG. 3, a user also may press "x" buttons adjacent each signal (or operate other graphical elements in various ways) to toggle the respective signal between influencing and not influencing light output of the lighting unit.

In some embodiments, where the user has not set priorities, various "default" priorities may be selected for signals based on various criteria. For example, signals such as wall switches that directly control light output of a lighting unit based on user input may be considered "stronger" than signals that tacitly control the lighting unit in response to events out of a user's control, such as remote applications (e.g., incoming social network message, team scores a goal) or sensors. "Stronger" signals may, in some cases, be assigned higher default priority than "weaker" signals. As another example, in some embodiments, signal priority may be selected based on relative proximity of a signal source to a lighting unit. A wall switch in the same room as the lighting unit may be given higher priority than, say, a remote application on a social network service or a lighting control application executing on a mobile computing device that is outside the room. In some embodiments, signal sources may be plugged into or otherwise connected to various sockets (e.g., USB sockets, power sockets). A signal source plugged into a socket that is closest to the lighting unit may receive highest priority, followed by a signal source plugged into the second closet socket, and so on.

Figure 5:
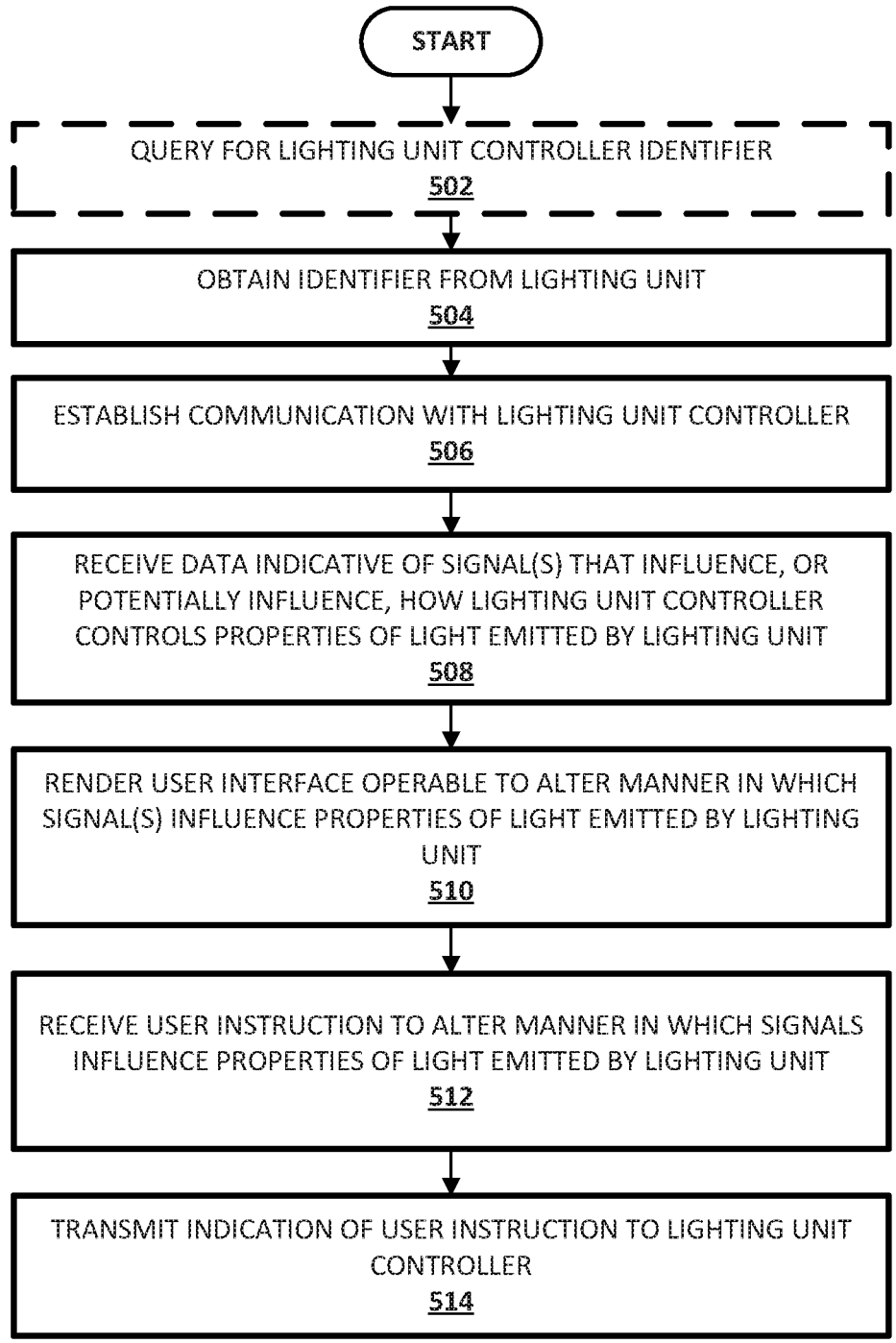
FIG. 5 depicts an example method that may be implemented by a mobile computing device, in accordance with various embodiments.

FIG. 5 depicts an example method 500 that may be performed by various components described herein, such as by mobile computing device 122. At optional block 502, various components, such as lighting unit 100, may be queried for an identifier associated with a lighting unit controller (e.g., 110). For example, mobile computing device 122 may broadcast a request, e.g., using NFC, ZigBee, BlueTooth, Wi-Fi, coded light etc., that lighting units in the area provide identifiers for their respective lighting unit controllers. The range of the broadcast may be proportional to the technology used (e.g. with NFC nearby lamps may addressed; with coded light, lamps or light effects in view of the sensor/camera of the mobile computing device may be addressed). At block 504, an identifier may be obtained from a responding lighting unit, e.g., using the same or similar technology as was used to query for the identifier at block 502. For example, the identifier may be extracted from a coded light signal contained in light emitted by the lighting unit and/or in light projected by the lighting unit onto one or more surfaces. As noted above, in some embodiments the lighting unit controller is integral with the lighting unit, in which case the lighting unit may simply provide its own identifier.

At block 506, using the identifier obtained at block 504, the mobile computing device may establish communication with the lighting unit controller. At block 508, the mobile computing device may receive, e.g., from the lighting unit controller, data indicative of one or more signals that influence, or potentially influence, how the lighting unit controller controls the one or more properties of light emitted by the lighting unit.

At block 510, the mobile computing device may render, e.g., on touch screen 124, a user interface operable to alter the manner in which the one or more signals influence the one or more properties of light emitted by the lighting unit. For example, in some embodiments, the mobile computing device may render an indication of relative priorities of influence by the one or more signals, as shown in FIG. 4. In some embodiments, the mobile computing device may render one or more graphical elements that are operable by a user to alter the relative priorities of influence by the one or more signals (e.g., the up and down arrows in FIG. 4). In some embodiments, such a user interface may include other operable elements to perform other tasks, including but not limited to activating new signals to influence (or potentially influence) one or more lighting units, adding or removing one or more lighting units from a signal's influence, modifying signals (e.g., changing rules, altering how remote applications influence light output, etc.), resolving conflicting signals, deactivate influence by signals, and so forth. In some embodiments, such an interface may also provide a user with an ability to "freeze" a lighting unit in its current light output state. This may prevent any signals from affecting light output by the lighting unit until the user "unfreezes" it.

In some embodiments, in addition to or instead of a user interface that is operable to alter the manner in which the one or more signals influence the one or more properties of light emitted by the lighting unit, a simpler user interface may be rendered that simply displays an indication of the signals. A user may then alter how the signals influence light by, for instance, altering the signals themselves (e.g., turning off a notification of when a team scores a goal). In some embodiments, the user interface may be more informative about the signal, and may even include a link or other mechanism that is configured to guide the user to additional information related to one or more signals.

For instance, suppose a parent is reading a book when a nearby lamp flashes green and white in quick succession. The parent, not knowing why the lamp flashed in this manner, may hold her mobile phone near the lamp. The mobile phone may then perform selected actions described herein to ascertain that the lamp's controller is configured to flash green and white when a particular team scores a goal. The mobile phone may render, e.g., on a touch screen, information that indicates that the signal is the team scoring the goal. In some instances, the mobile phone may further include a link or other similar mechanism that is operable by the parent to obtain more information about the signal. For instance, the mobile phone may display an alert or notification that the team has scored a goal. The alert or notification may include a hyperlink that, when clicked, causes a browser executing on the mobile phone to open a web page that reports on the sporting event in real time, including the score, box statistics, and so forth.

As another example, suppose again that the parent is reading a book when the nearby lamp starts flashing red and white. The parent may again hold her mobile phone near the lamp to see the reason (e.g., the signal) for the flashing. The mobile phone may ascertain that the signal is a severe weather alert that influences a lighting controller to cause the lamp to flash red and white light in quick succession to bring attention to the severe weather. The mobile phone may then render an alert or notification of the severe weather. As above, in some instances the alert or notification may include a link to more detailed information. In some instances, the mobile phone may establish communication with the signal source—e.g., a weather reporting service—to learn the cause of the signal and include information about the cause in the alert or notification.

Returning to method 500 of FIG. 5, at block 512, the mobile computing device may receive, e.g., at the user interface it rendered at block 510, a user instruction to alter a manner in which the one or more signals influence how the lighting unit controller controls the one or more properties of light emitted by the lighting unit. For example, the user may toggle on/off influence of one or more signals on one or more properties of light emitted by one or more lighting units. Or, the user may rearrange priorities of multiple signals. At block 514, the mobile computing device may transmit, via its wireless communication interface (e.g., 128) to the lighting unit controller, an indication of the user instruction. The lighting unit control may then implement the user instruction, e.g., by generating one or more lighting control commands for transmission to lighting unit 100.

Figure 6:
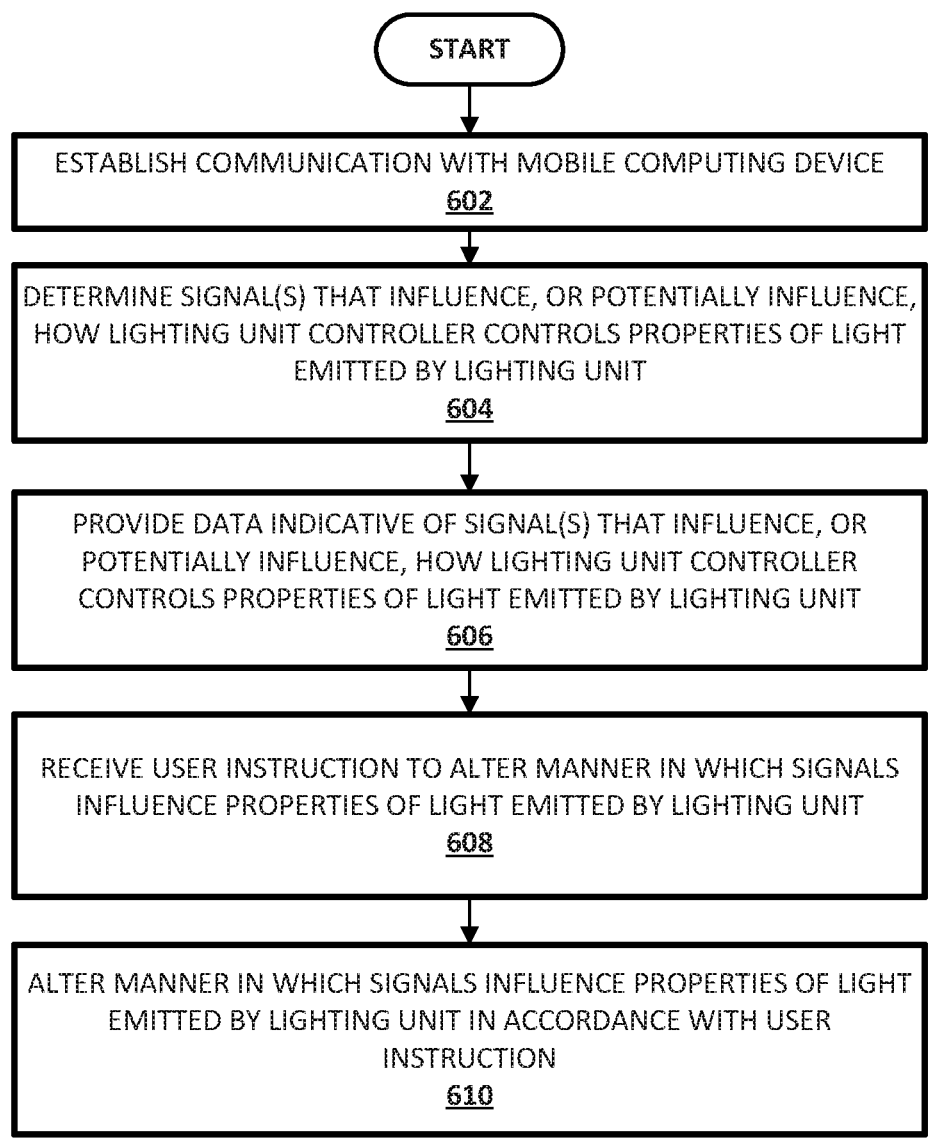
FIG. 6 depicts an example method that may be implemented by a lighting unit controller, in accordance with various embodiments.

FIG. 6 depicts an example method 600 that may be implemented by various components, such as lighting unit controller 110, in accordance with various embodiments. At block 602, communication may be established with a mobile computing device (e.g., 122). For instance, the mobile computing device may contact the lighting unit controller using the identifier the mobile computing device obtained at block 504 of FIG. 5.

At block 604, the lighting unit controller may determine one or more signals, e.g., external to the lighting unit controller and one or more lighting units controlled by the lighting unit controller, that influence, or potentially influence, how the lighting unit controller controls one or more properties of light to be emitted by the one or more lighting units. The lighting unit controller may determine what signals influence the light output of a lighting unit under its control in various ways. For instance, the lighting unit controller may act as a "gatekeeper" that determines whether a particular signal is permitted to cause alteration of values of one or more lighting state variables that control light output of the lighting unit. At block 606, the lighting unit controller may provide, e.g., to the mobile computing device, data indicative of one or more signals determined at block 604.

At block 608, the lighting unit controller may receive, e.g., from the mobile computing device, data indicative of a user instruction to alter a manner in which one or more signals influence or potentially influence one or more properties of light emitted by the lighting unit. At block 610, lighting unit control may act on the user instruction received at block 608 to alter a manner in which one or more signals influence or potentially influence one or more properties of light emitted by the lighting unit.

In some embodiments, lighting unit controller 110 or another component may implement various techniques to control access to signals, e.g., for privacy considerations. For example, a user may not wish others to see what signals influence or potential influence lighting units in his room. In such instances, lighting unit controller 110 or another component may identify signals differently to the user and to others. For instance, a social network signal indicating that a message is received from a significant other may be identified to the user as "girlfriend sends you a message," whereas the same signal may be identified more generically to the user's parents (e.g., "Signal01"). In some embodiments, signals influencing a lighting unit may only be observed from a computing device at which suitable user credentials (e.g., username/password, fingerprint, retinal scan, etc.) have been supplied.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computing device comprising:
    one or more processors;
    a user input having a touch screen;
    a wireless communication interface operably coupled with the one or more processors; and
    memory operably coupled with the one or more processors, the memory storing instructions that, in response to execution of the instructions by the one or more processors, cause the one or more processors to:
        receive, from a lighting unit controller over the wireless communication interface, data indicative of one or more signals obtainable by the lighting unit controller that automatically influence a manner in which the lighting unit controller controls one or more properties of light emitted by a lighting unit after receiving the data;
        display a visual representation of the one or more signals and a manner in which the one or more signals influence the manner in which the lighting unit controller controls one or more properties of light emitted by the lighting unit;
        obtain, from the lighting unit, an identifier associated with the lighting unit controller;
        establish communication with the lighting unit controller via the wireless communication interface based on the identifier;
        receive, at the user input, a user instruction to alter the manner in which the one or more signals influence how the lighting unit controller controls the one or more properties of light emitted by the lighting unit;
        transmit, via the wireless communication interface to the lighting unit controller, an indication of the user instruction;
        render, on the touch screen, a user interface operable to alter the manner in which the one or more signals influence the one or more properties of light emitted by the lighting unit; and
        render an indication of relative priorities of influence by the one or more signals.

2. The computing device of claim 1, wherein the memory further stores instructions that, in response to execution of the instructions by the one or more processors, cause the one or more processors to render one or more graphical elements that are operable by a user to alter the relative priorities of influence by the one or more signals.

3. The computing device of claim 1, wherein the memory further stores instructions that, in response to execution of the instructions by the one or more processors, cause the one or more processors to extract the identifier associated with the lighting unit controller from coded light emitted by the lighting unit.

4. The computing device of claim 1, wherein the memory further stores instructions that, in response to execution of the instructions by the one or more processors, cause the one or more processors to extract the identifier associated with the lighting unit controller from a radio signal emitted by the lighting unit.

5. The computing device of claim 1, wherein the one or more signals include a service or application operating on one or more remote computing devices.

6. The computing device of claim 1, wherein the one or more signals include one or more rules associated with a lighting system of which the lighting unit is a member.

7. The computing device of claim 1, wherein the memory further stores instructions that, in response to execution of the instructions by the one or more processors, cause the one or more processors to ascertain one or more signals that have previously influenced how the lighting unit controller controlled, or will influence in the future how the lighting unit controller controls, one or more properties of light emitted by the lighting unit.

8. The computing device of claim 1, wherein the lighting unit controller is part of a unit that is separate from the lighting unit.

9. The computing device of claim 1, wherein the data indicative of one or more signals comprises a trigger and an action responsive to the trigger.

10. The computing device of claim 1, wherein the trigger is based on a news update provided by a web service.

* * * * *